United States Patent
Barker et al.

(10) Patent No.: US 10,633,996 B2
(45) Date of Patent: Apr. 28, 2020

(54) TURBINE COOLING SYSTEM

(71) Applicant: Rolls-Royce Corporation, Indianapolis, IN (US)

(72) Inventors: Brett J. Barker, Indianapolis, IN (US); Bruce E. Varney, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 490 days.

(21) Appl. No.: 15/354,430

(22) Filed: Nov. 17, 2016

(65) Prior Publication Data
US 2018/0135460 A1    May 17, 2018

(51) Int. Cl.
*F01D 11/08* (2006.01)
*F01D 5/18* (2006.01)
*F01D 9/06* (2006.01)
*F01D 11/24* (2006.01)

(52) U.S. Cl.
CPC .............. *F01D 11/08* (2013.01); *F01D 5/187* (2013.01); *F01D 5/188* (2013.01); *F01D 5/189* (2013.01); *F01D 9/065* (2013.01); *F01D 11/24* (2013.01); *F05D 2240/11* (2013.01); *F05D 2300/6033* (2013.01); *Y02T 50/672* (2013.01); *Y02T 50/676* (2013.01)

(58) Field of Classification Search
CPC ......... F05D 2300/6033; F05D 2240/11; F05D 2260/20; F05D 2260/201; F05D 2260/202; F01D 5/186–189; F01D 5/282; F01D 5/284; F01D 9/041; F01D 11/08; F01D 25/12; Y02T 50/672; Y02T 50/676
See application file for complete search history.

(56) References Cited

U.S. PATENT DOCUMENTS

| | | | |
|---|---|---|---|
| 3,703,808 A * | 11/1972 | Stearns ..................... | F01D 5/18 415/115 |
| 4,302,148 A * | 11/1981 | Tubbs ....................... | F02C 7/18 415/115 |
| 4,820,116 A * | 4/1989 | Hovan ...................... | F01D 1/32 415/115 |
| 5,207,556 A * | 5/1993 | Frederick ................ | F01D 5/189 415/115 |
| 6,077,034 A | 6/2000 | Tomita et al. | |
| 8,408,866 B2 | 4/2013 | Weaver et al. | |
| 9,988,936 B2 * | 6/2018 | Nasr ......................... | F01D 9/04 |

(Continued)

FOREIGN PATENT DOCUMENTS

| EP | 1124039 A1 | 8/2001 |
|---|---|---|
| EP | 2631434 A2 | 8/2013 |
| EP | 3173583 A1 | 5/2017 |

*Primary Examiner* — Peter J Bertheaud
(74) *Attorney, Agent, or Firm* — Barnes & Thornburg LLP (57) ABSTRACT

A turbine assembly for a gas turbine engine is disclosed herein. The turbine assembly includes a turbine vane and an annular turbine shroud. The turbine vane has an airfoil extending through a primary gas path and is formed to include cooling passages sized to conduct cooling air from an inlet aperture to a discharge aperture. The turbine shroud is adapted to extend around a bladed turbine wheel to resist gasses from passing over turbine blades without interacting with the turbine blades. The turbine shroud includes a ceramic matrix composite blade track having a radially-inwardly facing inner surface arranged in confronting relation with the primary gas path.

19 Claims, 3 Drawing Sheets

(56) References Cited

U.S. PATENT DOCUMENTS

| | | | |
|---|---|---|---|
| 10,287,906 B2* | 5/2019 | Rice | F01D 11/005 |
| 2004/0047726 A1 | 3/2004 | Morrison | |
| 2005/0129499 A1 | 6/2005 | Morris | |
| 2015/0218951 A1 | 8/2015 | Weaver et al. | |
| 2016/0290157 A1* | 10/2016 | Ning | F01D 11/08 |
| 2016/0376897 A1* | 12/2016 | Spangler | F01D 25/12 |
| | | | 415/177 |
| 2017/0107852 A1* | 4/2017 | Nasr | F01D 9/04 |

* cited by examiner

TURBINE COOLING SYSTEM

FIELD OF THE DISCLOSURE

The present disclosure relates generally to gas turbine engines, and more specifically to turbine assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures and high pressures from products of the combustion reaction in the combustor. Such shrouds sometimes include components made from materials having allowable temperatures that may constrain exposure of the components to the high temperature and high pressure combustion products. To maintain the temperatures of those components below their allowable temperatures, cooling of those components may be desirable. Cooling those components while reducing the impact that such cooling has on engine performance remains an area of interest.

SUMMARY

The present disclosure may comprise one or more of the following features and combinations thereof.

According to one aspect of the present disclosure, a turbine section assembly may include a turbine vane, an annular turbine shroud, and a passageway. The turbine vane may have an airfoil extending through a primary gas path, and the turbine vane may be formed to include cooling passages sized to conduct cooling air from an inlet aperture to a discharge aperture. The turbine shroud may be adapted to extend around a bladed turbine wheel to resist gasses from passing over turbine blades without interacting with the turbine blades, and the turbine shroud may have a ceramic matrix composite blade track having a radially-inwardly facing inner surface arranged in confronting relation with the primary gas path. The passageway may extend from the discharge aperture of the cooling passages to the ceramic matrix composite blade track to conduct cooling air from the turbine vane to the ceramic matrix composite blade track radially outward of the primary gas path after the cooling air has been passed through and warmed in the turbine vane so that the ceramic matrix composite blade track is actively cooled at a location radially outward of the inner surface by warmed cooling air to manage the temperature and the thermal gradient across the ceramic matrix composite blade track during operation of the turbine section assembly.

In some embodiments, the ceramic matrix composite blade track may include a runner providing the inner surface and an attachment feature extending radially outward from a radially-outwardly facing outer surface of the runner, and the warmed cooling air may be applied to the outer surface of the runner during operation of the turbine section assembly. The runner may be formed to include internal air passages sized to conduct the warmed cooling air at least partway through the runner during operation of the turbine section assembly.

In some embodiments, the turbine vane may include an inner wall and an outer wall defining an exterior of the turbine vane, the inner wall and the outer wall may cooperate to define a gap therebetween configured to receive cooling air provided thereto, and the discharge aperture may be fluidly coupled to the gap. The turbine vane may be formed to include central cavities located internal to the gap and the discharge aperture may be fluidly coupled to the central cavities.

In some embodiments, the turbine vane may include internal cavities located internal to an exterior of the turbine vane, the internal cavities may be fluidly coupled to the discharge aperture, and the cooling passages may extend through the internal cavities to conduct cooling air through the turbine vane to the discharge aperture along a serpentine path during operation of the turbine section assembly. Additionally, in some embodiments, the passageway may be arranged radially outward of the primary gas path.

In some embodiments, a source of cooling air may be configured to provide cooling air to the inlet aperture of the turbine vane such that warmed cooling air at a first pressure is provided to the ceramic matrix composite blade track by the turbine vane during operation of the turbine section assembly, gasses at a second pressure may be passed along the primary gas path during operation of the turbine section assembly, and the first pressure may be greater than the second pressure. The inlet aperture may be located radially inward of the primary gas path.

According to another aspect of the present disclosure, a turbine section assembly may include a turbine vane, a turbine shroud, and a passageway. The turbine vane may be formed to include cooling passages that extend from an inlet aperture to a discharge aperture. The turbine shroud may include a ceramic matrix composite blade track. The passageway may extend from the discharge aperture of the cooling passages to the ceramic matrix composite blade track to provide cooling air passed through the turbine vane to the ceramic matrix composite blade track to actively cool the ceramic matrix composite blade track during operation of the turbine section assembly.

In some embodiments, the ceramic matrix composite blade track may include a runner having a radially-inwardly facing inner surface and a radially-outwardly facing outer surface and an attachment feature extending radially outward from the runner, and the cooling air provided to the ceramic matrix composite blade track by the passageway may be applied to the outer surface during operation of the turbine section assembly. Additionally, in some embodiments, the turbine vane may include an inner wall and an outer wall defining an exterior of the turbine vane, the inner wall and the outer wall may cooperate to define a gap therebetween configured to receive cooling air provided thereto, and the discharge aperture may be fluidly coupled to the gap. The turbine vane may be formed to include central cavities located internal to the gap and the discharge aperture may be fluidly coupled to the central cavities.

In some embodiments, the turbine vane may include internal cavities located internal to an exterior of the turbine vane, the internal cavities may be fluidly coupled to the discharge aperture, and the cooling passages may extend through the internal cavities to conduct cooling air through the turbine vane to the discharge aperture along a serpentine path during operation of the turbine section assembly. A source of cooling air may be configured to provide cooling air to the inlet aperture of the turbine vane such that cooling air at a first pressure is provided to the ceramic matrix composite blade track by the turbine vane during operation of the turbine section assembly, gasses at a second pressure may be passed along a primary gas path located radially inward of the passageway during operation of the turbine section assembly, and the first pressure may be greater than the second pressure.

According to yet another aspect of the present disclosure, a gas turbine engine may include a compressor section, a combustor section, and a turbine section. The compressor section may be configured to provide cooling air. The combustor section may be configured to discharge pressurized gasses along a primary gas path. The turbine section may be configured to receive the cooling air provided by the compressor section and the pressurized gasses discharged by the combustor section along the primary gas path. The turbine section may have an assembly having a turbine vane, a turbine shroud, and a passageway. The turbine vane may be formed to include cooling passages sized to conduct the cooling air from an inlet aperture to a discharge aperture. The turbine shroud may have a ceramic matrix composite blade track. The passageway may extend from the discharge aperture of the cooling passages to the ceramic matrix composite blade track to provide cooling air passed through the turbine vane to the ceramic matrix composite blade track to actively cool the ceramic matrix composite blade track during operation of the gas turbine engine.

In some embodiments, the ceramic matrix composite blade track of the turbine shroud may include a runner having a radially-inwardly facing inner surface arranged in confronting relation with the primary gas path and a radially-outwardly facing outer surface and an attachment feature extending radially outward from the runner, and the cooling air provided to the ceramic matrix composite blade track by the passageway may be applied to the outer surface during operation of the gas turbine engine. The compressor section may be configured to provide cooling air to the inlet aperture such that cooling air at a first pressure is provided to the ceramic matrix composite blade track by the turbine vane during operation of the gas turbine engine, gasses at a second pressure may be passed along the primary gas path during operation of the turbine section assembly, and the first pressure may be greater than the second pressure. The passageway may be arranged radially outward of the primary gas path. Additionally, in some embodiments, the turbine vane may include an inner wall and an outer wall defining an exterior of the turbine vane, the inner wall and the outer wall may cooperate to define a gap therebetween configured to receive cooling air provided thereto, and the discharge aperture may be fluidly coupled to the gap.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
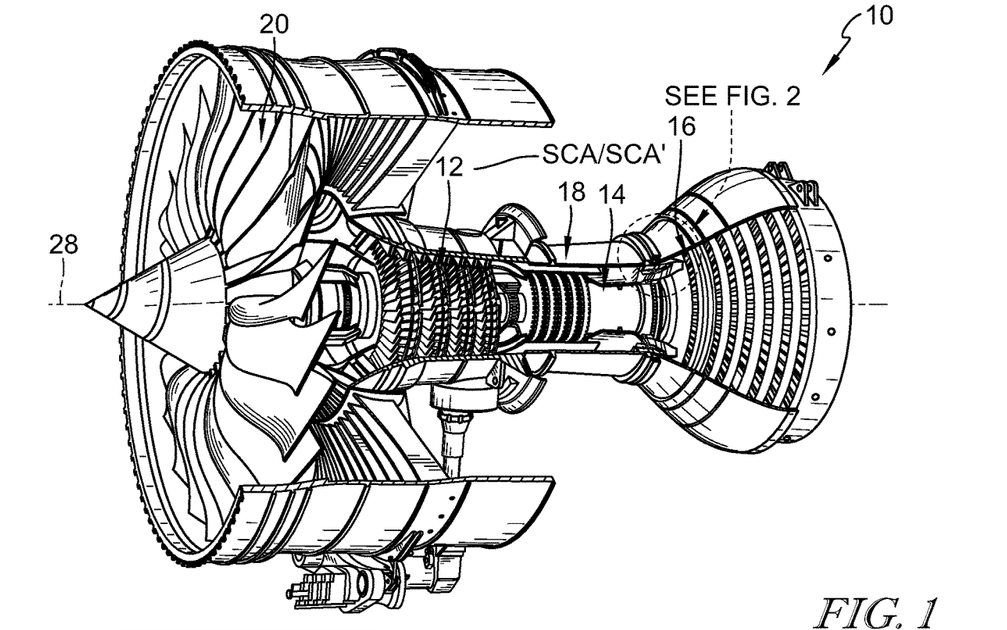
FIG. 1 is a cut-away perspective view of a gas turbine engine showing that the gas turbine engine includes a turbine section.

Referring now to FIG. 1, an illustrative gas turbine engine 10 includes a compressor 12, a combustor 14, and a turbine 16 mounted to and supported by a case 18. The compressor 12 compresses and delivers air to the combustor 14. The combustor 14 mixes fuel with the compressed air received from the compressor 12 and ignites the air-fuel mixture. The hot, high-pressure products of the combustion reaction in the combustor 14 are directed into the turbine 16 and the turbine 16 extracts work to drive the compressor 12 and a fan 20 included in the engine 10.

Figure 2:
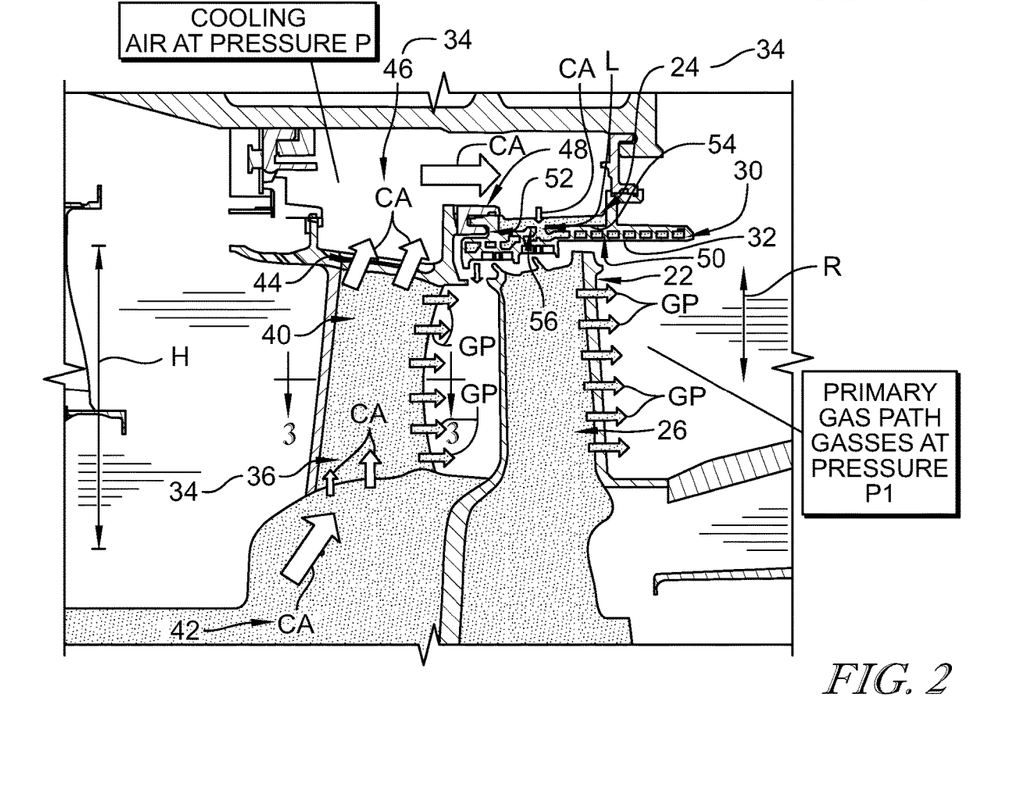
FIG. 2 is a partial cross-sectional view of the turbine section of FIG. 1 showing that the turbine section includes a turbine vane that has cooling passages extending from an inlet aperture to a discharge aperture, a turbine shroud that has a ceramic matrix composite blade track, and a passageway extending from the discharge aperture of the cooling passages to the ceramic matrix composite blade track to provide previously used cooling air passed through the turbine vane to the ceramic matrix composite blade track to actively cool the ceramic matrix composite blade track during operation of the turbine assembly.

Referring now to FIG. 2, the turbine 16 illustratively includes a turbine wheel assembly 22 and an annular turbine shroud 24. The turbine wheel assembly 22 has blades 26 that are pushed by the combustion products (i.e., hot, high-pressure gasses) from the combustor 14 to cause the assembly 22 to rotate about a central axis 28. The turbine shroud 24 extends around the blades 26 of the assembly 22 to resist gasses from passing over the blades 26 without interacting with the blades 26 (i.e., without pushing the blades 26 to cause the assembly 22 to rotate). The turbine shroud 24 includes a ceramic matrix composite blade track 30 having an inner surface 32 that faces inward in a radial direction indicated by arrow R. The inner surface 32 is arranged in confronting relation with a primary gas path GP along which hot, high-pressure gasses discharged by the combustor 14 are passed during operation of the engine 10.

An illustrative turbine assembly 34 adapted for use in the turbine 16 includes the turbine shroud 24, a turbine vane 36, sometimes called a nozzle guide vane or simply a vane 36, and a passageway 46 as shown in FIG. 2. The turbine vane 36 includes an airfoil 38 that extends through the primary gas path GP and cooling passages 40 that are sized to conduct cooling air CA provided by a source of cooling air SCA from an inlet aperture 42 to a discharge aperture 44. The passageway 46 extends from the discharge aperture 44 of the cooling passages 40 to the ceramic matrix composite blade track 30. The passageway 46 is configured to conduct cooling air CA from the discharge aperture 44 to the blade track 30 radially outward of the primary gas path GP after the cooling air CA has been passed through and warmed in the turbine vane 36. Warmed cooling air CA conducted to the ceramic matrix composite blade track 30 by the passageway 46 actively cools the blade track 30 at a location L radially outward of the inner surface 32 to manage the temperature and the thermal gradient across the blade track 30 during operation of the assembly 34.

The source of cooling air SCA is illustratively configured to provide cooling air CA to the inlet aperture 42 which is located radially inward of the primary gas path GP as shown in FIG. 2. Cooling air CA provided by the source of cooling air SCA to the inlet aperture 42 is conducted radially outward through the cooling passages 40 to the discharge aperture 44 so that the cooling air CA is warmed by the turbine vane 36 during operation of the turbine assembly 34. Warmed cooling air CA discharged by the discharge aperture 44 is provided to the passageway 46 which is located radially outward of the primary gas path GP.

In the illustrative embodiment, the source of cooling air SCA is embodied as, or otherwise includes, the compressor 12. In other embodiments, the source of cooling air SCA may be embodied as, or otherwise include, another suitable source of cooling air CA.

In the illustrative embodiment, the source of cooling air SCA is configured to provide cooling air CA to the inlet aperture 42 such that warmed cooling air CA at a first pressure P is provided to the blade track 30 by the turbine vane 36 during operation of the turbine assembly 34. Gasses at a second pressure P1 are passed along the primary gas path GP during operation of the assembly 34. The first pressure P is greater than the second pressure P1.

Referring again to FIG. 2, the annular turbine shroud 24 illustratively includes a metallic carrier 48 coupled to the ceramic matrix composite blade track 30 and fluidly coupled to the passageway 46. The carrier 48 is configured to couple to the case 18 and the blade track 30 is configured to at least partially shield the carrier 48 from gasses passed along the primary gas path GP defined in part by the inner surface 32. In some embodiments, warmed cooling air CA conducted by the passageway 46 to the blade track 30 may be passed through the carrier 48 before being provided to the location L of the blade track 30. In other embodiments, warmed cooling air CA conducted by the passageway 46 to the blade track 30 may be provided to the location L without first being passed through the carrier 48.

The ceramic matrix composite blade track 30 illustratively includes a runner 50 and an attachment feature 52 as shown in FIG. 2. The runner 50 includes the inner surface 32 and an outer surface 54 arranged opposite the inner surface 32 that faces radially outward. The attachment feature 52 is interconnected with and extends radially outward from the outer surface 54. Warmed cooling air CA conducted by the passageway 46 to the blade track 30 is applied to the outer surface 54 during operation of the turbine assembly 34.

In the illustrative embodiment, the runner 50 of the ceramic matrix composite blade track 30 is formed to include internal air passages 56 as shown in FIG. 2. The internal air passages 56 are sized to conduct warmed cooling air CA provided to the blade track 30 by the passageway 46 at least partway through the runner 50 to actively cool the blade track 30 during operation of the turbine assembly 34. As such, the internal air passages 56 are sized to conduct warmed cooling air applied to the outer surface 54 toward the inner surface 32 during operation of the assembly 34.

Figure 3:
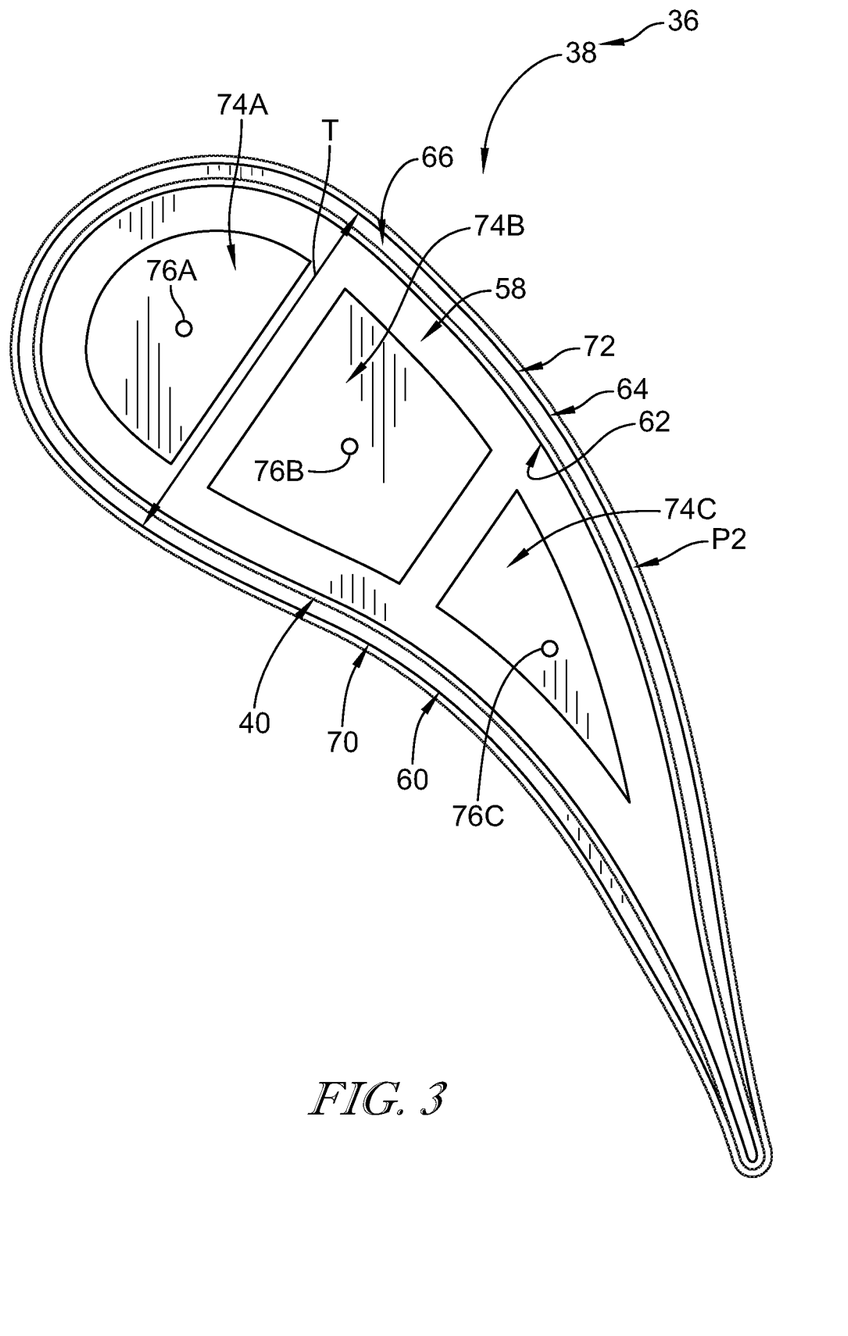
FIG. 3 is a plan view of the turbine vane included in the turbine section assembly of FIG. 2 showing that the turbine vane includes an inner wall and an outer wall defining an exterior of the turbine vane, and showing that the inner wall and the outer wall cooperate to define a gap therebetween configured to receive cooling air from the inlet aperture and provide cooling air to the discharge aperture.

Referring now to FIG. 3, the airfoil 38 of the turbine vane 36 illustratively includes an inner layer 58 and an outer layer 60 coupled to the inner layer 58. The inner layer 58 and the outer layer 60 respectively provide an inner wall 62 and an outer wall 64 defining the exterior of the turbine vane 36. As such, the airfoil 38 may be referred to as a dual-wall structure 38 having the inner and outer layers 58, 60 that provide the cooling passages 40.

In some embodiments, the inner wall 62 and the outer wall 64 cooperate to define a gap 66 therebetween as shown in FIG. 3. The gap 66 extends radially over an entire height H of the turbine vane 36 and is fluidly coupled to each of the inlet aperture 42 and the discharge aperture 44. The gap 66 extends along pressure and suction sides 70, 72 of the turbine vane 36 such that the gap 66 extends generally over an entire perimeter P2 of the vane 36 defined by the sides 70, 72.

The gap 66 is configured to receive cooling air CA provided to the inlet aperture 42 by the source of cooling air SCA and discharge the cooling air CA as shown in FIGS. 2 and 3. Specifically, the gap 66 is configured to discharge cooling air CA received from the source of cooling air SCA to the discharge aperture 44 after the cooling air CA is warmed during operation of the turbine assembly 34. Additionally, in some embodiments, the gap 66 may be configured to discharge cooling air CA to the pressure side 70 of the turbine vane 36 to actively cool the side 70 during operation of the turbine assembly 34.

The inner layer 58 of the turbine vane 36 illustratively defines central cavities 74A, 74B, 74C that are located internal to the gap 66 as shown in FIG. 3. One or more of the central cavities 74A, 74B, 74C may be embodied as, or otherwise include, a cooling air plenum adapted to receive cooling air CA provided by the source of cooling air SCA to the inlet aperture 42. The cavities 74A, 74B, 74C are fluidly coupled to the inlet aperture 42 and the discharge aperture 44. The cavities 74A, 74B, 74C may provide respective openings 76A, 76B, 76C configured to provide cooling air CA received at the inlet aperture 42 to the discharge aperture 44.

Referring again to FIGS. 2 and 3, the illustrative turbine assembly 34 may provide a number of benefits. Those benefits are described in greater detail below with reference to the operation of the turbine assembly 34.

Exposure to heat may cause turbine vane temperature to approach, or even exceed, the operational limit of the vane. Cooling air CA conduction through the turbine vane 36 prior to delivery to the ceramic matrix composite blade track 30 during operation of the assembly 34 as shown in FIG. 2 reduces the temperature of the turbine vane 36. As a result, the turbine vane 36 may be constructed of materials (e.g., metallic materials) whose operational limits might be exceeded if cooling air CA was not conducted through the vane 36. Put differently, conduction of cooling air CA through the vane 36 permits the vane 36 to be constructed of less temperature-resistant materials than might otherwise be the case if cooling air CA was not conducted through the vane 36.

Turbine vane thickness may be associated with undesirable blockages (e.g., a blockage of the primary gas path) or losses in performance (e.g., losses due to mixing of primary and secondary flows) occurring during turbine operation. Cooling air CA conduction through the turbine vane 36 during operation of the assembly 34 at least partially enables a smaller thickness T of the turbine vane 36 shown in FIG. 3 to be achieved than might otherwise be the case if cooling air CA was not conducted through the vane 36. As a result, the thickness T may increase resistance of the vane 36 to blockages and performance losses compared to other configurations. For example, compared to other vane configurations having greater thicknesses, the smaller thickness T of the vane 36 may provide aerodynamic benefits that are not provided by those other configurations.

Supply of cooling air to turbine vanes at locations radially outward of the primary flow path of hot, high-pressure gasses may be associated with undesirable blockages occurring during turbine operation. For example, debris tending to migrate away from the primary flow path into the cooling air supply may pass with the cooling air into the turbine and cause blockages of turbine components. Supply of cooling air CA by the source of cooling air SCA to the turbine vane 36 at the inlet aperture 42 radially inward of the primary gas path GP as shown in FIG. 2 reduces the tendency of such debris to pass with the cooling air CA into the turbine 16. As a result, the supply of cooling air CA to the inlet aperture 42 may be associated with less blockages and/or increased performance than might otherwise be the case if cooling air CA was supplied to the vane 36 radially outward of the gas path GP.

Temperature differences of gasses passed radially inward and radially outward of the blade track during operation thereof may be associated with undesirable stresses experienced by the blade track. Because the cooling air CA is warmed by the turbine vane 36 prior to delivery to the blade track 30, the temperature of the warmed cooling air CA is brought closer to the temperature of the gasses passed along the primary gas path GP during operation of the assembly 34. As a result, temperature differences of the warmed cooling air CA passed radially outward of the blade track 30 and the gasses passed radially inward of the blade track 30 are reduced. Consequently, the operational stresses experienced by the blade track 30 are also reduced such that the blade track 30 may be more stably supported in the case 18 compared to other configurations.

Figure 4:
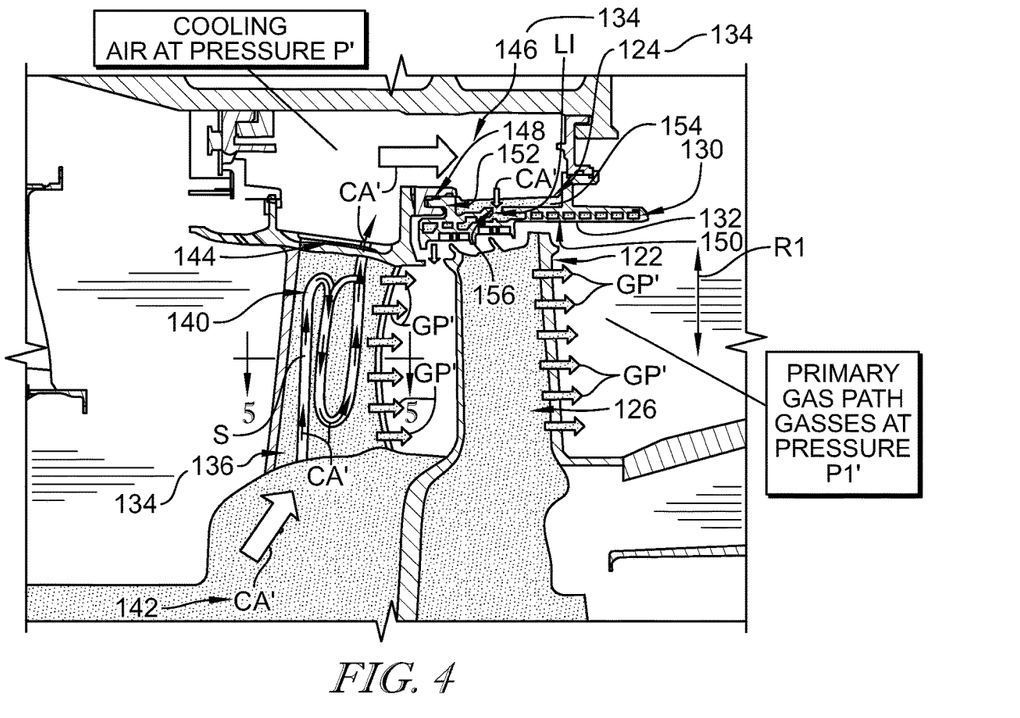
FIG. 4 is a partial cross-sectional view of another turbine section assembly adapted for use in the turbine section of FIG. 1 showing that the turbine section assembly includes a turbine vane that has cooling passages extending from an inlet aperture to a discharge aperture, a turbine shroud that has a ceramic matrix composite blade track, and a passageway extending from the discharge aperture of the cooling passages to the ceramic matrix composite blade track to provide previously used cooling air passed through the turbine vane to the ceramic matrix composite blade track to actively cool the ceramic matrix composite blade track during operation of the turbine assembly, and also showing that the cooling passages extend through the turbine vane along a serpentine path.

Referring now to FIG. 4, another illustrative turbine assembly 134 adapted for use in the turbine 16 of the gas turbine engine 10 is shown. The turbine assembly 134 includes an annular turbine shroud 124 extending around blades 126 of a wheel assembly 122 to resist gasses from passing over the blades 126 without interacting with the blades 126. The turbine shroud 124 includes a ceramic matrix composite blade track 130 having an inner surface 132 that faces inward in a radial direction indicated by arrow R1. The inner surface 132 is arranged in confronting relation with a primary gas path GP' along which hot, high-pressure gasses are passed during operation of the assembly 134.

In addition to the turbine shroud 124, the turbine assembly 134 illustratively includes a turbine vane 136, sometimes called a nozzle guide vane or simply a vane 136, and a passageway 146 as shown in FIG. 4. The turbine vane 136 includes an airfoil 138 that extends through the primary gas path GP' and cooling passages 140 that are sized to conduct cooling air CA' provided by a source of cooling air SCA' from an inlet aperture 142 to a discharge aperture 144. The passageway 146 extends from the discharge aperture 144 of the cooling passages 140 to the ceramic matrix composite blade track 130. The passageway 146 is configured to conduct cooling air CA' from the discharge aperture 144 to the blade track 130 radially outward of the primary gas path GP' after the cooling air CA' has been passed through and warmed in the turbine vane 136. Warmed cooling air CA' conducted to the ceramic matrix composite blade track 130 by the passageway 146 actively cools the blade track 130 at a location L1 radially outward of the inner surface 132 to manage the temperature and the thermal gradient across the blade track 130 during operation of the assembly 134.

The source of cooling air SCA' is illustratively configured to provide cooling air CA' to the inlet aperture 142 which is located radially inward of the primary gas path GP' as shown in FIG. 4. Cooling air CA' provided by the source of cooling air SCA' to the inlet aperture 142 is conducted through the cooling passages 140 to the discharge aperture 144 so that the cooling air CA' is warmed by the turbine vane 136 during operation of the turbine assembly 134. Warmed cooling air CA' discharged by the discharge aperture 144 is provided to the passageway 146 which is located radially outward of the primary gas path GP'.

In the illustrative embodiment, the source of cooling air SCA' is embodied as, or otherwise includes, the compressor 12. In other embodiments, the source of cooling air SCA' may be embodied as, or otherwise include, another suitable source of cooling air CA'.

In the illustrative embodiment, the source of cooling air SCA' is configured to provide cooling air CA' to the inlet aperture 142 such that warmed cooling air CA' at a first pressure P' is provided to the blade track 130 by the turbine vane 136 during operation of the turbine assembly 134. Gasses at a second pressure P1' are passed along the primary gas path GP' during operation of the assembly 134. The first pressure P' is greater than the second pressure P1'.

Referring again to FIG. 4, the annular turbine shroud 124 illustratively includes a metallic carrier 148 coupled to the ceramic matrix composite blade track 130 and fluidly coupled to the passageway 146. The carrier 148 is configured to couple to the case 18 and the blade track 130 is configured to at least partially shield the carrier 148 from gasses passed along the primary gas path GP' defined in part by the inner surface 132. In some embodiments, warmed cooling air CA' conducted by the passageway 146 to the blade track 130 may be passed through the carrier 148 before being provided to the location L1 of the blade track 130. In other embodiments, warmed cooling air CA' conducted by the passageway 146 to the blade track 130 may be provided to the location L1 without first being passed through the carrier 148.

The ceramic matrix composite blade track 130 illustratively includes a runner 150 and an attachment feature 152 as shown in FIG. 4. The runner 150 includes the inner surface 132 and an outer surface 154 arranged opposite the inner surface 132 that faces radially outward. The attachment feature 152 is interconnected with and extends radially outward from the outer surface 154. Warmed cooling air CA' conducted by the passageway 146 to the blade track 130 is applied to the outer surface 154 during operation of the turbine assembly 134.

In the illustrative embodiment, the runner 150 of the ceramic matrix composite blade track 130 is formed to include internal air passages 156 as shown in FIG. 4. The internal air passages 156 are sized to conduct warmed cooling air CA' provided to the blade track 130 by the passageway 146 at least partway through the runner 150 to actively cool the blade track 130 during operation of the turbine assembly 134. As such, the internal air passages 156 are sized to conduct warmed cooling air applied to the outer surface 154 toward the inner surface 132 during operation of the assembly 134.

Figure 5:
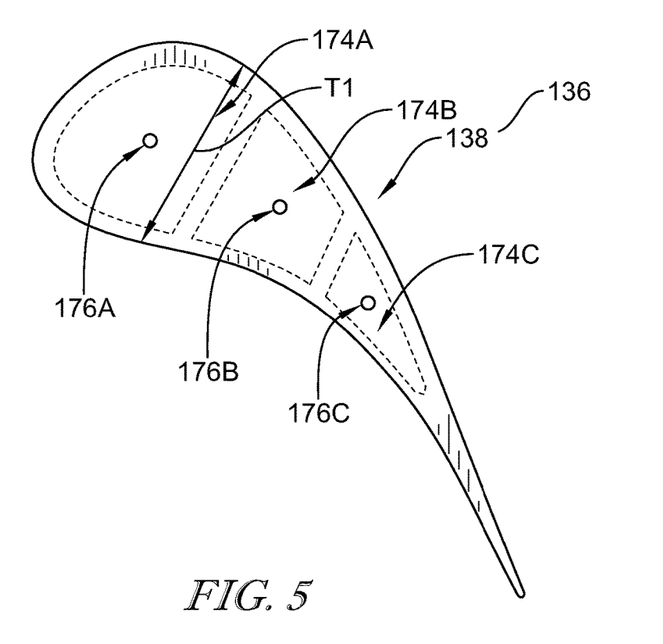
FIG. 5 is a plan view of the turbine vane included in the turbine section assembly of FIG. 4 showing that the turbine vane includes internal cavities and suggesting that the cooling passages extend through the internal cavities to conduct cooling air through the turbine vane along the serpentine path during operation of the turbine section assembly.

The illustrative airfoil 138 defines internal cavities 174A, 174B, 174C that are located internal to the exterior of the airfoil 138 as shown in FIG. 5. One or more of the internal cavities 174A, 174B, 174C may be embodied as, or otherwise include, a cooling air plenum adapted to receive cooling air CA' provided by the source of cooling air SCA' to the inlet aperture 142. The cavities 174A, 174B, 174C are fluidly coupled to the inlet aperture 142 and the discharge aperture 144.

The cooling passages 140 illustratively extend through the internal cavities 174A, 174B, 174C to conduct cooling air CA' through the turbine vane 136 to the discharge aperture 144 along a serpentine path S during operation of the turbine assembly 134 as shown in FIGS. 4 and 5. The cooling passages 140 may provide openings 176A, 176B, 176C and at least one of the openings 176A, 176B, 176C may be configured to provide cooling air CA' received at the inlet aperture 142 to the discharge aperture 144. The openings 176A, 176B, 176C may be fluidly coupled to, and at least partially located in, respective internal cavities 174A, 174B, 174C.

Referring still to FIGS. 4 and 5, the illustrative turbine assembly 134 may provide a number of benefits. Those benefits are described in greater detail below with reference to the operation of the turbine assembly 134.

Exposure to heat may cause turbine vane temperature to approach, or even exceed, the operational limit of the vane. Cooling air CA' conduction through the turbine vane 136 prior to delivery to the ceramic matrix composite blade track 130 during operation of the assembly 134 as shown in FIG. 4 reduces the temperature of the turbine vane 136. As a result, the turbine vane 136 may be constructed of materials (e.g., metallic materials) whose operational limits might be exceeded if cooling air CA' was not conducted through the vane 136. Put differently, conduction of cooling air CA' through the vane 136 permits the vane 136 to be constructed of less temperature-resistant materials than might otherwise be the case if cooling air CA' was not conducted through the vane 136.

Turbine vane thickness may be associated with undesirable blockages (e.g., a blockage of the primary gas path) or losses in performance (e.g., losses due to mixing of primary and secondary flows) occurring during turbine operation. Cooling air CA' conduction through the turbine vane 136 during operation of the assembly 134 at least partially enables a smaller thickness T1 of the turbine vane 136 shown in FIG. 5 to be achieved than might otherwise be the case if cooling air CA was not conducted through the vane 36. As a result, the thickness T1 may increase resistance of the vane 136 to blockages and performance losses compared to other configurations. For example, compared to other vane configurations having greater thicknesses, the smaller thickness T of the vane 36 may provide aerodynamic benefits that are not provided by those other configurations.

Supply of cooling air to turbine vanes at locations radially outward of the primary flow path of hot, high-pressure gasses may be associated with undesirable blockages occurring during turbine operation. For example, debris tending to migrate away from the primary flow path into the cooling air supply may pass with the cooling air into the turbine and cause blockages of turbine components. Supply of cooling air CA' by the source of cooling air SCA' to the turbine vane 136 at the inlet aperture 142 radially inward of the primary gas path GP' as shown in FIG. 4 reduces the tendency of such debris to pass with the cooling air CA' into the turbine 16. As a result, the supply of cooling air CA' to the inlet aperture 142 may be associated with less blockages and/or increased performance than might otherwise be the case if cooling air CA' was supplied to the vane 136 radially outward of the gas path GP'.

Temperature differences of gasses passed radially inward and radially outward of the blade track during operation thereof may be associated with undesirable stresses experienced by the blade track. Because the cooling air CA' is warmed by the turbine vane 136 prior to delivery to the blade track 130, the temperature of the warmed cooling air CA' is brought closer to the temperature of the gasses passed along the primary gas path GP' during operation of the assembly 134. As a result, temperature differences of the warmed cooling air CA' passed radially outward of the blade track 130 and the gasses passed radially inward of the blade track 130 are reduced. Consequently, the operational stresses experienced by the blade track 130 are also reduced such that the blade track 130 may be more stably supported in the case 18 compared to other configurations.

Turbines included in gas turbine engines may provide cooling air (e.g., cooling air CA, CA') to a nozzle guide vane (e.g., the turbine vanes 36, 136) and a blade track (e.g., the blade tracks 30, 130) via separate feeds. Blade tracks may be lightly cooled such that cooling air provided to the blade track may be used primarily to purge a cavity defined in part by the blade track.

The present disclosure may provide a mechanism for conducting cooling air supplied to the blade track through the nozzle guide vane to improve usage of the cooling air. As a result, the present disclosure may provide a number of benefits compared to other configurations. In one example, conducting cooling air through the nozzle guide vane may allow the nozzle vane to be constructed of relatively low heat-resistant materials and nevertheless withstand relatively high operating temperatures. In another example, conducting cooling air through the nozzle guide vane may permit the nozzle guide vane to have a thickness (e.g., thickness T, T1) providing greater resistance to blockages and performance losses than other configurations. In yet another example, providing cooling air to the nozzle guide vane radially inward (e.g., at the inlet apertures 42, 142) of the primary gas path (e.g., gas paths GP, GP') may permit the nozzle guide vane to provide greater resistance to blockages than other configurations. In yet another example still, conducting cooling air through the nozzle guide vane prior to delivery to the blade track may reduce stresses experienced by the blade track compared to other configurations.

The present disclosure may provide a mechanism for reducing the amount of cooling air supplied to a turbine (e.g., turbine 16) during operation thereof and thereby improving the specific fuel consumption of the engine (e.g., the engine 10). Additionally, the present disclosure may provide a mechanism for reducing stresses experienced by a ceramic matrix composite (CMC) blade track during operation of the turbine.

The present disclosure may provide a mechanism for improving the cooling of the nozzle guide vane and reducing temperature gradients in the CMC blade track. The present disclosure may also provide a mechanism for extending the service life of the CMC blade track. Cooling air may be passed through the nozzle guide vane depending on the amount of cooling needed by the nozzle guide vane for a particular application.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section assembly, the assembly comprising
a turbine vane including an airfoil extending through a primary gas path, the turbine vane formed to include cooling passages sized to conduct cooling air from an inlet aperture to a discharge aperture, the inlet aperture radially inboard of the primary gas path, the discharge aperture radially outboard of the primary gas path, and the cooling passages extending from the inlet aperture to the discharge aperture,
an annular turbine shroud adapted to extend around a bladed turbine wheel to resist gasses from passing over turbine blades without interacting with the turbine blades, the turbine shroud including a ceramic matrix composite blade track having a radially-inwardly facing inner surface arranged in confronting relation with the primary gas path, and
a passageway extending from the discharge aperture of the cooling passages to the ceramic matrix composite blade track to conduct cooling air from the turbine vane to the ceramic matrix composite blade track radially outward of the primary gas path after the cooling air has been passed through and warmed in the turbine vane so that the ceramic matrix composite blade track is actively cooled at a location radially outward of the inner surface by warmed cooling air to manage the temperature and the thermal gradient across the ceramic matrix composite blade track during operation of the turbine section assembly;
wherein the turbine vane includes an inner wall and an outer wall defining an exterior of the turbine vane, the inner wall and the outer wall cooperate to define a gap therebetween configured to receive cooling air provided thereto, wherein the gap acts as one of the cooling passages, thereby conducting cooling air from the inlet aperture to the discharge aperture.

2. The turbine section assembly of claim 1, wherein the ceramic matrix composite blade track includes a runner providing the inner surface and an attachment feature extending radially outward from a radially-outwardly facing outer surface of the runner and the warmed cooling air is applied to the outer surface of the runner during operation of the turbine section assembly.

3. The turbine section assembly of claim 2, wherein the runner is formed to include internal air passages sized to conduct the warmed cooling air at least partway through the runner during operation of the turbine section assembly.

4. The turbine section assembly of claim 1, wherein the turbine vane is formed to include central cavities located internal to the gap and the discharge aperture is fluidly coupled to the central cavities.

5. The turbine section assembly of claim 1, wherein the turbine vane includes internal cavities located internal to an exterior of the turbine vane, the internal cavities are fluidly coupled to the discharge aperture, and at least one of the cooling passages extends through the internal cavities to conduct cooling air through the turbine vane to the discharge aperture along a serpentine path during operation of the turbine section assembly.

6. The turbine section assembly of claim 1, wherein the passageway is arranged radially outward of the primary gas path.

7. The turbine section assembly of claim 1, wherein a source of cooling air is configured to provide cooling air to the inlet aperture of the turbine vane such that warmed cooling air at a first pressure is provided to the ceramic matrix composite blade track by the turbine vane during operation of the turbine section assembly, gasses at a second pressure are passed along the primary gas path during operation of the turbine section assembly, and the first pressure is greater than the second pressure.

8. A turbine section assembly, the assembly comprising
a turbine vane formed to include cooling passages that extend from an inlet aperture to a discharge aperture, the inlet aperture radially inboard of a primary gas path and the discharge aperture radially outboard of the primary gas path,
a turbine shroud including a ceramic matrix composite blade track, and
a passageway extending from the discharge aperture of the cooling passages to the ceramic matrix composite blade track to provide cooling air passed through the turbine vane to the ceramic matrix composite blade track to actively cool the ceramic matrix composite blade track during operation of the turbine section assembly;
wherein the turbine vane includes an inner wall and an outer wall defining an exterior of the turbine vane, the inner wall and the outer wall cooperate to define a gap therebetween configured to receive cooling air provided thereto, wherein the gap acts as one of the cooling passages, thereby conducting cooling air from the inlet aperture to the discharge aperture.

9. The turbine section assembly of claim 8, wherein the ceramic matrix composite blade track includes a runner having a radially-inwardly facing inner surface and a radially-outwardly facing outer surface and an attachment feature extending radially outward from the runner and the cooling air provided to the ceramic matrix composite blade track by the passageway is applied to the outer surface during operation of the turbine section assembly.

10. The turbine section assembly of claim 8, wherein the turbine vane is formed to include central cavities located internal to the gap and the discharge aperture is fluidly coupled to the central cavities.

11. The turbine section assembly of claim 8, wherein the turbine vane includes internal cavities located internal to an exterior of the turbine vane, the internal cavities are fluidly coupled to the discharge aperture, and at least one of the cooling passages extends through the internal cavities to conduct cooling air through the turbine vane to the discharge aperture along a serpentine path during operation of the turbine section assembly.

12. The turbine section assembly of claim 11, wherein a source of cooling air is configured to provide cooling air to the inlet aperture of the turbine vane such that cooling air at a first pressure is provided to the ceramic matrix composite blade track by the turbine vane during operation of the turbine section assembly, gasses at a second pressure are passed along a primary gas path located radially inward of the passageway during operation of the turbine section assembly, and the first pressure is greater than the second pressure.

13. A gas turbine engine comprising
a compressor section configured to provide cooling air,
a combustor section configured to discharge pressurized gasses along a primary gas path, and
a turbine section configured to receive the cooling air provided by the compressor section and the pressurized gasses discharged by the combustor section along the primary gas path, the turbine section including an assembly having
  a turbine vane formed to include cooling passages sized to conduct the cooling air from an inlet aperture to a discharge aperture, the inlet aperture radially inboard of the primary gas path and the discharge aperture radially outboard of the primary gas path,
  a turbine shroud having a ceramic matrix composite blade track, and
  a passageway extending from the discharge aperture of the cooling passages to the ceramic matrix composite blade track to provide cooling air passed through the turbine vane to the ceramic matrix composite blade track to actively cool the ceramic matrix composite blade track during operation of the gas turbine engine;
wherein the turbine vane includes an inner wall and an outer wall defining an exterior of the turbine vane, the inner wall and the outer wall cooperate to define a gap therebetween configured to receive cooling air provided thereto, wherein the gap acts as one of the cooling passages, thereby conducting cooling air from the inlet aperture to the discharge aperture.

14. The gas turbine engine of claim 13, wherein the ceramic matrix composite blade track of the turbine shroud includes a runner having a radially-inwardly facing inner surface arranged in confronting relation with the primary gas path and a radially-outwardly facing outer surface and an attachment feature extending radially outward from the runner and the cooling air provided to the ceramic matrix composite blade track by the passageway is applied to the outer surface during operation of the gas turbine engine.

15. The gas turbine engine of claim 14, wherein the compressor section is configured to provide cooling air to the inlet aperture such that cooling air at a first pressure is provided to the ceramic matrix composite blade track by the turbine vane during operation of the gas turbine engine, gasses at a second pressure are passed along the primary gas path during operation of the turbine section assembly, and the first pressure is greater than the second pressure.

16. The gas turbine engine of claim 15, wherein the passageway is arranged radially outward of the primary gas path.

17. The turbine section assembly of claim 5 wherein the serpentine path reverses direction twice between the inlet aperture and the discharge aperture.

18. The turbine section assembly of claim 11 wherein the serpentine path reverses direction twice between the inlet aperture and the discharge aperture.

19. The turbine section assembly of claim 13 wherein at least one of the cooling passages extends along a serpentine path.

* * * * *